US012625268B2

(12) United States Patent
Yao et al.

(10) Patent No.: US 12,625,268 B2
(45) Date of Patent: May 12, 2026

(54) ROBOT RELOCALIZATION METHOD AND APPARATUS, AND STORAGE MEDIUM AND ELECTRONIC DEVICE

(71) Applicant: JINGDONG TECHNOLOGY INFORMATION TECHNOLOGY CO., LTD., Beijing (CN)

(72) Inventors: Xiujun Yao, Beijing (CN); Fuqiang Ma, Beijing (CN); Chao Wang, Beijing (CN); Chenguang Gui, Beijing (CN); Lihua Cui, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 785 days.

(21) Appl. No.: 18/005,362

(22) PCT Filed: Jun. 8, 2021

(86) PCT No.: PCT/CN2021/098981
§ 371 (c)(1),
(2) Date: Jan. 13, 2023

(87) PCT Pub. No.: WO2022/012229
PCT Pub. Date: Jan. 20, 2022

(65) Prior Publication Data
US 2023/0266470 A1 Aug. 24, 2023

(30) Foreign Application Priority Data
Jul. 15, 2020 (CN) .......................... 202010680255.2

(51) Int. Cl.
*G01S 17/89* (2020.01)
*G01S 17/58* (2006.01)
*G06V 10/44* (2022.01)

(52) U.S. Cl.
CPC .............. *G01S 17/89* (2013.01); *G01S 17/58* (2013.01); *G06V 10/443* (2022.01)

(58) Field of Classification Search
CPC ........ G01S 17/89; G01S 17/58; G06V 10/443
See application file for complete search history.

(56) References Cited

FOREIGN PATENT DOCUMENTS

CN     106092104 A     11/2016
CN     108759844 A     11/2018
(Continued)

OTHER PUBLICATIONS

Extended European Search Report Jul. 4, 2024 of European Application No. 21842606.2.
(Continued)

*Primary Examiner* — Jamil Ahmed
(74) *Attorney, Agent, or Firm* — Qinghong Xu

(57) ABSTRACT

A robot relocalization method and apparatus, and a storage medium and an electronic device. The method comprises: performing feature coding on local visual features of image data to obtain image vector features, and searching, in a pre-set key frame database, for the image vector features subjected to dimension reduction processing, so as to obtain a plurality of search results (S120); solving the pose of a robot according to each search result, so as to obtain a first pose initial value, and performing matching on laser point cloud data in a pre-set two-dimensional grid map according to speed data and displacement data, so as to obtain a first matching result (S130); and generating a second matching result according to the first pose initial value and the first matching result, and performing robot relocalization according to a second pose initial value, the first matching result and the second matching result.

20 Claims, 5 Drawing Sheets

(56) References Cited

FOREIGN PATENT DOCUMENTS

| | | | | | |
|---|---|---|---|---|---|
| CN | 109084732 | A | * 12/2018 | ............ | G01C 11/00 |
| CN | 109389641 | A | 2/2019 | | |
| CN | 109460267 | A | 3/2019 | | |
| CN | 110533722 | A | 12/2019 | | |
| CN | 110657803 | A | 1/2020 | | |
| CN | 111931589 | A | 11/2020 | | |
| WO | 2013071190 | A1 | 5/2013 | | |
| WO | 2019062651 | A1 | 4/2019 | | |

OTHER PUBLICATIONS

Anonymous, VLAD—An extension of Bag of Words, URL:https://web.archive.org/web/20170522052658/https://ameyajoshi005.wordpress.com/2014/03/29/vlad-an-extension-of-bag-of-words/, published on May 22, 2017, p. 1-5.
Weizhao Shao et al., Stereo Visual Inertial LiDAR Simultaneous Localization and Mapping, published on Feb. 27, 2019.
Eleftherios Spyromitros-Xioufis et al., A Comprehensive Study over VLAD and Product Quantization in Large-scale Image Retrieval, URL:https://mever.gr/publications/A_Comprehensive_Study_over_VLAD_and_Prod.pdf, published on Jul. 1, 2014, p. 1-16.
Fredrik Ginsberg et al., Optimizing Multi-Robot Localization With Extended Kalman Filter Feedback and Collaborative Laser Scan Matching, URL:https://www.diva-portal.org/smash/get/diva2:1440617/FULLTEXT01.pdf, published on Jun. 15, 2020.
1st Office Action dated Jul. 22, 2023 of Chinese Application No. 202010680255.2.
International Search Report dated Sep. 9, 2021 for PCT International Application No. PCT/CN2021/098981.

* cited by examiner

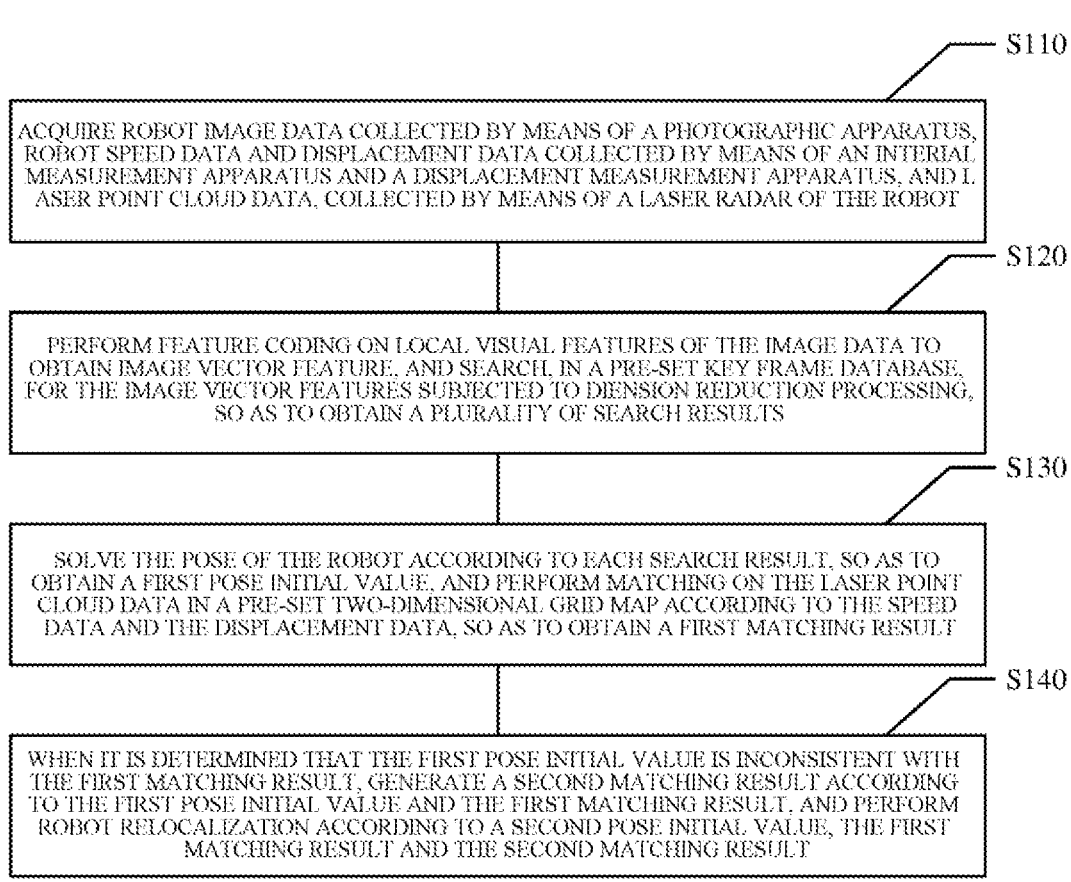

S110

ACQUIRE ROBOT IMAGE DATA COLLECTED BY MEANS OF A PHOTOGRAPHIC APPARATUS, ROBOT SPEED DATA AND DISPLACEMENT DATA COLLECTED BY MEANS OF AN INTERIAL MEASUREMENT APPARATUS AND A DISPLACEMENT MEASUREMENT APPARATUS, AND L ASER POINT CLOUD DATA, COLLECTED BY MEANS OF A LASER RADAR OF THE ROBOT

S120

PERFORM FEATURE CODING ON LOCAL VISUAL FEATURES OF THE IMAGE DATA TO OBTAIN IMAGE VECTOR FEATURE, AND SEARCH, IN A PRE-SET KEY FRAME DATABASE, FOR THE IMAGE VECTOR FEATURES SUBJECTED TO DIENSION REDUCTION PROCESSING, SO AS TO OBTAIN A PLURALITY OF SEARCH RESULTS

S130

SOLVE THE POSE OF THE ROBOT ACCORDING TO EACH SEARCH RESULT, SO AS TO OBTAIN A FIRST POSE INITIAL VALUE, AND PERFORM MATCHING ON THE LASER POINT CLOUD DATA IN A PRE-SET TWO-DIMENSIONAL GRID MAP ACCORDING TO THE SPEED DATA AND THE DISPLACEMENT DATA, SO AS TO OBTAIN A FIRST MATCHING RESULT

S140

WHEN IT IS DETERMINED THAT THE FIRST POSE INITIAL VALUE IS INCONSISTENT WITH THE FIRST MATCHING RESULT, GENERATE A SECOND MATCHING RESULT ACCORDING TO THE FIRST POSE INITIAL VALUE AND THE FIRST MATCHING RESULT, AND PERFORM ROBOT RELOCALIZATION ACCORDING TO A SECOND POSE INITIAL VALUE, THE FIRST MATCHING RESULT AND THE SECOND MATCHING RESULT

FIG.1

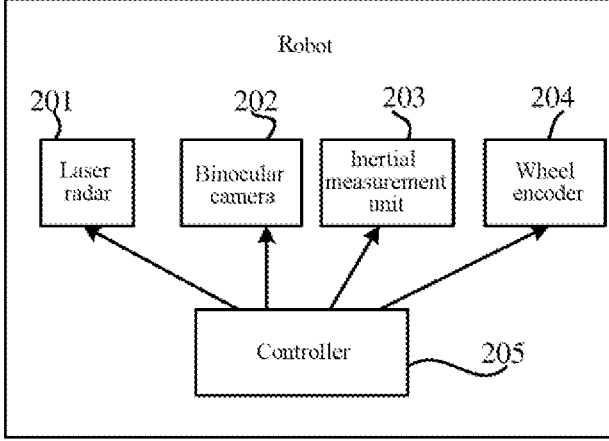

FIG.2

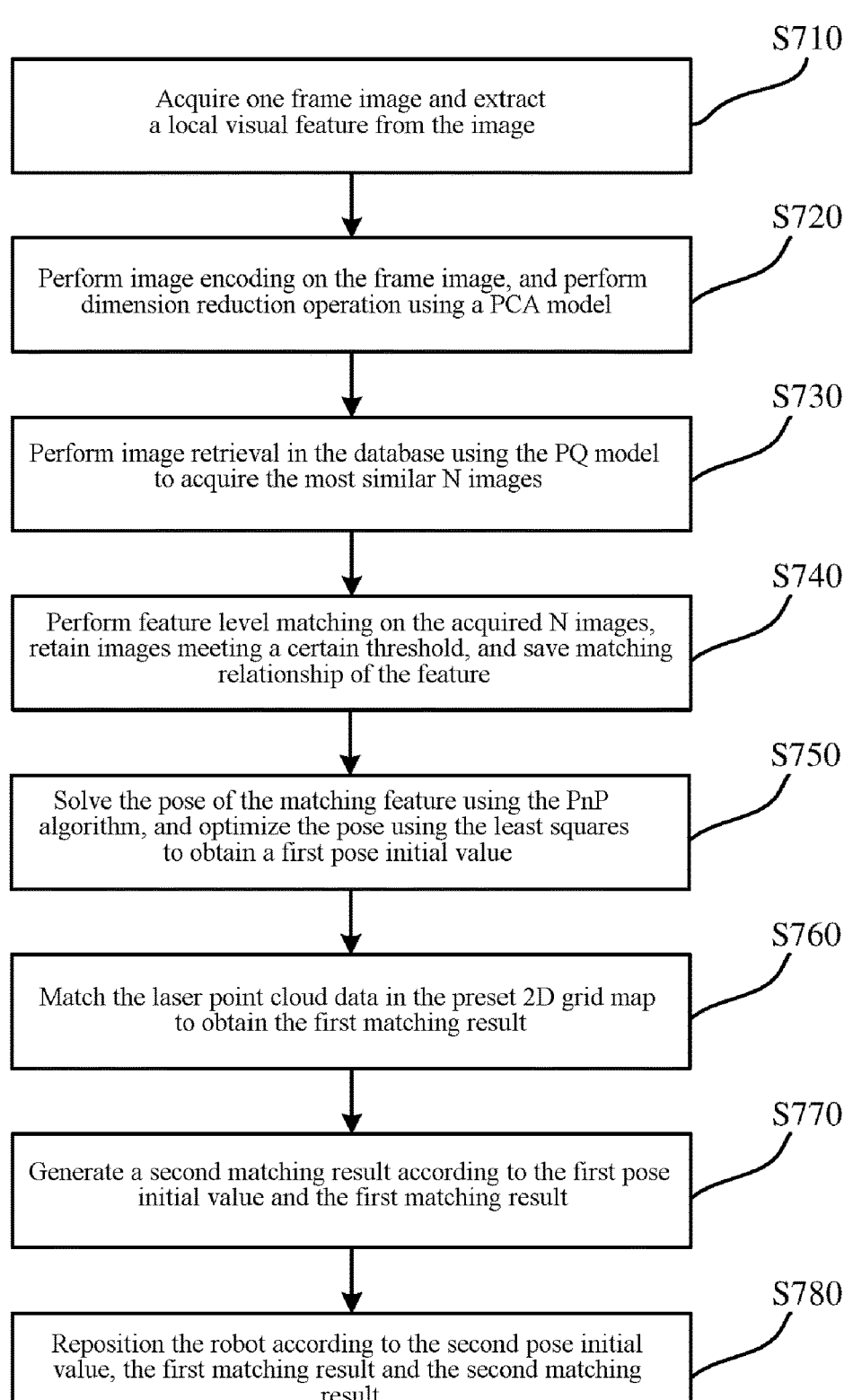

S710

Acquire one frame image and extract
a local visual feature from the image

S720

Perform image encoding on the frame image, and perform
dimension reduction operation using a PCA model

S730

Perform image retrieval in the database using the PQ model
to acquire the most similar N images

S740

Perform feature level matching on the acquired N images,
retain images meeting a certain threshold, and save matching
relationship of the feature

S750

Solve the pose of the matching feature using the PnP
algorithm, and optimize the pose using the least squares
to obtain a first pose initial value

S760

Match the laser point cloud data in the preset 2D grid map
to obtain the first matching result

S770

Generate a second matching result according to the first pose
initial value and the first matching result

S780

Reposition the robot according to the second pose initial
value, the first matching result and the second matching
result

FIG.7

ROBOT RELOCALIZATION METHOD AND APPARATUS, AND STORAGE MEDIUM AND ELECTRONIC DEVICE

CROSS REFERENCE

The present application is an US national phase of International Application No. PCT/CN2021/098981, filed Jun. 8, 2021, which claims priority to Chinese Patent Application No. 202010680255.2, filed Jul. 15, 2020, titled "ROBOT RELOCALIZATION METHOD AND APPARATUS, AND STORAGE MEDIUM AND ELECTRONIC DEVICE".

TECHNICAL FIELD

The embodiments of the present disclosure relate to the field of robot technology, in particular, to a method for repositioning a robot, an apparatus for repositioning a robot, a computer-readable storage medium, and an electronic device.

BACKGROUND

With the continuous development of artificial intelligence, the application scenarios of robots have been greatly expanded, bringing great convenience to people's production and life. At the same time, the requirements for the efficiency and intelligence of robots are also increasingly high. For example, for autonomous walking robots, it is required that robots have more efficient walking path planning for walking routes.

At present, the positioning method based on vision and laser simultaneous localization and mapping (SLAM) can use environmental information for active positioning, without the need to modify the environment.

SUMMARY

According to an aspect of the present disclosure, a method for repositioning a robot is provided, including:

acquiring image data of the robot collected by a camera apparatus, speed data and displacement data of the robot collected by an inertial measuring apparatus and a displacement measuring apparatus, and laser point cloud data of the robot collected by a laser radar;

performing a feature encoding on a local visual feature of the image data to obtain an image vector feature, and retrieving the image vector feature after a dimension reduction processing in a preset key frame database to obtain a plurality of retrieval results;

solving a post of the robot according to the retrieval results to obtain a first post initial value, and matching the laser point cloud data in a preset two-dimensional grid map according to the speed data and displacement data to obtain a first matching result; and in response to determination that the first post initial value and the first matching result are inconsistent, generating a second matching result according to the first post initial value and the first matching result, and repositioning the robot according to a second pose initial value, the first matching result, and the second matching result.

In an exemplary embodiment of the present disclosure, the performing the feature encoding on the local visual feature of the image data to obtain the image vector feature includes:

extracting the local visual feature of the image data, and searching for a visual word adjacent to the local visual feature in a preset visual dictionary;

calculating a residual vector between the local visual feature and the visual word, and performing a cumulative sum operation on the residual vectors belonging to a same visual word to obtain a residual sum vector; and connecting the residual sum vectors according to an index order of the visual words in the preset visual dictionary to obtain the image vector feature.

In an exemplary embodiment of the present disclosure, the retrieving the image vector feature after the dimension reduction processing in the preset key frame database to obtain the plurality of retrieval results, includes:

performing the dimension reduction processing on the image vector feature, and spatially dividing the image vector feature after the dimension reduction processing to obtain a plurality of sub vectors;

acquiring a cluster center corresponding to each sub vector and an index of each cluster center in the preset key frame database, and calculating a distance between each sub vector and each cluster center;

in response to determination that the distance is less than a preset threshold, acquiring an image vector corresponding to the cluster center according to the index of the cluster center, and obtaining a plurality of the retrieval results according to a plurality of the image vectors.

In an exemplary embodiment of the present disclosure, the solving the post of the robot according to the retrieval results to obtain the first post initial value, includes:

performing a feature matching on each retrieval result to obtain matching features between individual retrieval results and a matching relationship between the matching features;

solving the pose of the robot according to the matching features and the matching relationship between the matching features, to obtain the first pose initial value.

In an exemplary embodiment of the present disclosure, the matching the laser point cloud data in the preset two-dimensional grid map according to the speed data and displacement data to obtain the first matching result, includes:

fusing the speed data and the displacement data to obtain a second pose initial value;

matching the laser point cloud data in the preset two-dimensional grid map based on the second pose initial value to obtain the first matching result.

In an exemplary embodiment of the present disclosure, the repositioning the robot according to the second pose initial value, the first matching result and the second matching result, includes:

configuring a first weight value, a second weight value and a third weight value respectively for the second pose initial value, the first matching result and the second matching result;

performing a weighted summation on the second pose initial value, the first matching result, the second matching result, and the first weight value, the second weight value, and the third weight value respectively;

repositioning the robot according to a result of the weighted summation.

In an exemplary embodiment of the present disclosure, the method for repositioning a robot further includes:

determining whether the image data meets a preset condition; if yes, storing the image data in the key frame database as a key frame;

where the preset condition comprises at least one of the following:

a difference between the speed data and speed data at a previous moment corresponding to the speed data is greater than a preset speed threshold;

a difference between the displacement data and displacement data at a previous moment corresponding to the displacement data is greater than a preset displacement threshold;

an overlapping part between the image data and image data of a previous frame corresponding to the image data is less than a preset overlapping threshold.

According to an aspect of the present disclosure, an apparatus for repositioning a robot is provided, including:

a data acquisition module, configured to acquire image data of the robot collected by a camera apparatus, speed data and displacement data of the robot collected by an inertial measuring apparatus and a displacement measuring apparatus, and laser point cloud data of the robot collected by a laser radar;

a feature encoding module, configured to perform a feature encoding on a local visual feature of the image data to obtain an image vector feature, and retrieve the image vector feature after a dimension reduction processing in a preset key frame database to obtain a plurality of retrieval results;

a data matching module, configured to solve a pose of the robot according to the retrieval results to obtain a first pose initial value, and match the laser point cloud data in a preset two-dimensional grid map according to the speed data and displacement data to obtain a first matching result; and a repositioning module, configured to, in response to determination that the first post initial value and the first matching result are inconsistent, generate a second matching result according to the first pose initial value and the first matching result, and reposition the robot according to a second pose initial value, the first matching result and the second matching result.

According to an aspect of the present disclosure, there is provided a computer-readable storage medium on which a computer program is stored, where when the computer program is executed by a processor, the method for repositioning a robot according to any one of the above is implemented.

According to an aspect of the present disclosure, there is provided an electronic device, including:

a processor; and a memory for storing executable instructions of the processor;

where the processor is configured to execute the method for repositioning a robot according to any one of the above by executing the executable instructions.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure. Obviously, the drawings in the following description are only some embodiments of the present disclosure, and for those of ordinary skill in the art, other drawings can also be obtained from these drawings without creative effort. In the drawings:

FIG. 1 schematically shows a flowchart of a method for repositioning a robot according to an exemplary embodiment of the present disclosure.

FIG. 2 schematically shows a structure diagram of a robot according to an exemplary embodiment of the present disclosure.

FIG. 7 schematically shows a flowchart of another method for repositioning a robot according to an exemplary embodiment of the present disclosure.

DETAILED DESCRIPTION

Figure 3:
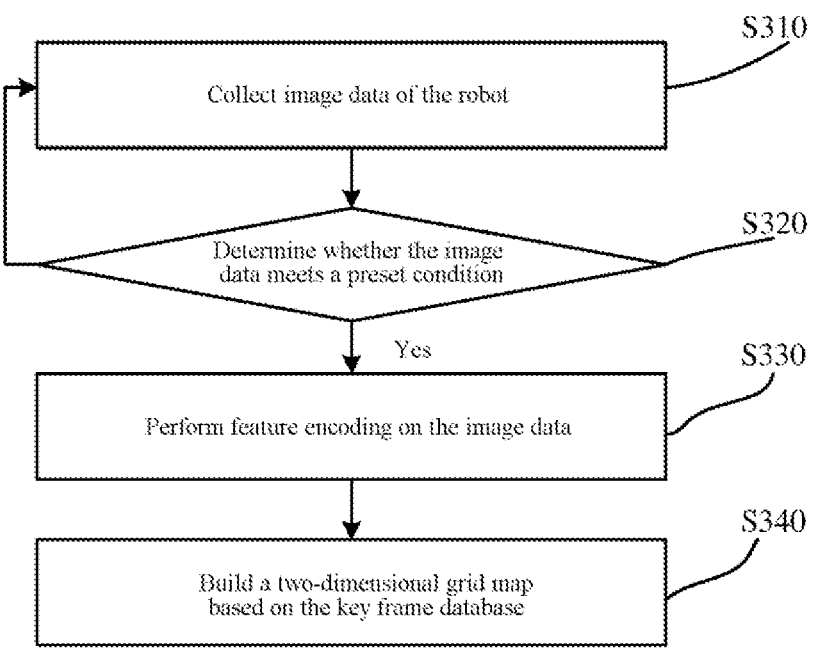
FIG. 3 schematically shows a flowchart of a construction method of a two-dimensional grid map according to an exemplary embodiment of the present disclosure.

The exemplary embodiments will now be described more fully with reference to the accompanying drawings. However, the exemplary embodiments can be implemented in various forms and should not be construed as being limited to the examples set forth herein; rather, these embodiments are provided so that the present disclosure will be more comprehensive and complete, and the concepts of the exemplary embodiments will be fully conveyed to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings represent the same or similar parts, and thus repeated descriptions thereof will be omitted. Some of the block diagrams shown in the drawings are functional entities and do not necessarily correspond to physically or logically independent entities. These functional entities may be implemented in software, or in one or more hardware modules or integrated circuits, or in different networks and/or processor apparatuses and/or microcontroller apparatuses.

Navigation and positioning technology is one of the key technologies of indoor robot system. At present, commonly used positioning technologies mainly include Outside-In and Inside-Out. The positioning manner of Outside-In includes the visual positioning method based on April tag (visual benchmark library) code and the positioning method based on visible light communication; and the Inside-Out method includes vision and laser simultaneous localization and mapping (SLAM) positioning method.

However, the above methods have the following defects. On the one hand, the positioning manner of Outside-In needs to set priori information in the use environment in advance, and reform the work environment to a certain extent, which limits the expansion of the use scenario. On the other hand, the positioning manner of Inside-Out may use the environment information for active positioning, and does not need to reform the environment. However, with the expansion of the scene, the positioning robustness of the traditional positioning algorithm in complex and unstructured scenes cannot meet the application requirements, such as the repositioning problem in repeated scenes; the positioning accuracy in unstructured scenes; and the positioning robustness in open scenes.

In an exemplary embodiment, a method for repositioning a robot is first provided, which may run on the robot. Those skilled in the art can also run the methods disclosed in the present disclosure on other platforms as required, which is not specially limited in this exemplary embodiment. Referring to FIG. 1, the robot's repositioning method may include the following steps.

In step S110, image data of the robot collected by a camera apparatus, speed data and displacement data of the robot collected by an inertial measurement apparatus and a displacement measurement apparatus, and laser point cloud data of the robot collected by a laser radar are acquired.

In step S120, feature encoding is performed on a local visual feature of the image data to obtain an image vector feature, and the image vector feature after dimension reduction processing is retrieved in a preset key frame database to obtain a plurality of retrieval results.

In step S130, a pose of the robot is solved according to the retrieval results to obtain a first pose initial value, and the laser point cloud data is matched in a preset two-dimensional grid map according to the speed data and displacement data to obtain a first matching result.

In step S140, when it is determined that the first pose initial value and the first matching result are inconsistent, a second matching result is generated according to the first pose initial value and the first matching result, and the robot is repositioned according to a second pose initial value, the first matching result, and the second matching result.

In the above method for repositioning a robot, on the one hand, the image vector feature is obtained by performing feature encoding on the local visual feature of the image data, and the image vector feature after dimension reduction processing is retrieved in the preset key frame database to obtain a plurality of retrieval results; according to the retrieval results, the robot's pose is solved to obtain the first pose initial value, and the laser point cloud data is matched in the preset two-dimensional grid map according to the speed data and displacement data to obtain the first matching result; finally, the robot is repositioned according to the first pose initial value, the first matching result and the second matching result, which solves the problem that the existing technology cannot realize the repositioning in the repeated scene. On the other hand, the first pose initial value is obtained by solving the pose of the robot according to the retrieval results, and the laser point cloud data is matched in the preset two-dimensional grid map according to the speed data and displacement data to obtain the first matching result; finally, the robot is repositioned according to the first pose initial value, the first matching result and the second matching result, which solves the problem of low positioning accuracy in the unstructured scene in the existing technology. On another hand, since the image data, speed data, displacement data and laser point cloud data are collected by different sensors, multi-sensor fusion is realized, which further improves the accuracy of repositioning result of the robot.

In the following, the steps involved in the repositioning method of the robot in the exemplary embodiment of the present disclosure will be explained and described in detail in combination with the drawings.

First, the robot involved in the exemplary embodiments of the present disclosure will be explained and described. As shown in FIG. 2, the robot may include a laser radar 201, a binocular camera (camera apparatus) 202, an Inertial Measurement Unit (IMU) 203, a wheel encoder (Odom) 204, and a controller 205.

The laser radar may be used to collect the laser point cloud data of the robot, the binocular camera may be used to collect the image data of the robot, the inertial measurement unit may be used to collect acceleration data and angular speed data of the robot, the wheel encoder may be used to collect a moving distance of the robot; and the controller may be used to execute the method for repositioning a robot described in the present application.

Secondly, the mapping process involved in the exemplary embodiment of the present disclosure, that is, the process of building a two-dimensional grid map, is explained and described. Specifically, in the process of creating a 2D grid map using laser SLAM, the camera is used to capture key frame images and feature encoding is performed on the key frame images. The methods of feature encoding may be Bog of words (BoW), Vector of Aggregate Locally Descriptor (VLAD), NetVLAD, etc.

The specific mapping process may be referred to FIG. 3.

In step S310, the image data of the robot is collected through the binocular camera, the speed data and displacement data of the robot are collected through the inertial measurement unit and the wheel encoder, and the laser point cloud data of the robot is collected through the laser radar.

In step S320, it is determined whether the image data meets a preset condition; where the preset condition includes at least one of the following:

a difference between the speed data and speed data at the previous moment corresponding to the speed data is greater than a preset speed threshold;

a difference between the displacement data and displacement data at the previous moment corresponding to the displacement data is greater than a preset displacement threshold;

an overlapping part between the image data and image data of the previous frame corresponding to the image data is less than a preset overlapping threshold.

In step S330, if yes, feature encoding is performed on the image data, and the image data after feature encoding is stored in a key frame database as a key frame; if not, the process skips to step S310.

In step S340, a two-dimensional (2D) grid map is built based on the key frame database.

Taking the VLAD algorithm as an example, the specific process of feature encoding of the image data is explained and described. The same function can also be achieved by using the tree-shaped BoW algorithm and NetVLAD. First, a frame of image is acquired and a local visual feature is extracted from the image; secondly, K-means algorithm is used to obtain a visual dictionary; then, the nearest neighbor visual word is searched for from the local visual feature of the current image, and a residual vector is calculated, and then the residual vectors of the same visual word are accumulated and summed; finally, the residual vectors formed by all visual words are linked head to tail to form a super long vector. The dimension of the super long vector is k*d, where k is the number of clustering centers and d is the dimension of local visual features. Further, when the mapping is completed, PCA dimension reduction is performed on image coding of all database images, such as reducing the dimension to D=128; then the Product Quantization (PQ) model is trained with the database data after dimension reduction by PCA.

Hereinafter, step S110 to step S140 are explained and described.

In step S110, the image data of the robot collected by the camera apparatus, the speed data and displacement data of the robot collected by the inertial measurement apparatus and the displacement measurement apparatus, and the laser point cloud data of the robot collected by the laser radar are acquired.

In this exemplary embodiment, the imaging apparatus may be a binocular camera, the inertial measurement apparatus may be an Inertial measurement unit (IMU), and the displacement measurement apparatus may be a wheel encoder (Odom), for example. Specifically, the controller may acquire the image data of the robot from the binocular camera, the acceleration data and angular speed data of the robot from the IMU, the displacement data of the robot from the wheel encoder, and finally the laser point cloud data of the robot from the laser radar.

In step S120, feature encoding is performed on a local visual feature of the image data to obtain an image vector feature, and the image vector feature after dimension reduction processing is retrieved in a preset key frame database to obtain a plurality of retrieval results.

Figure 4:
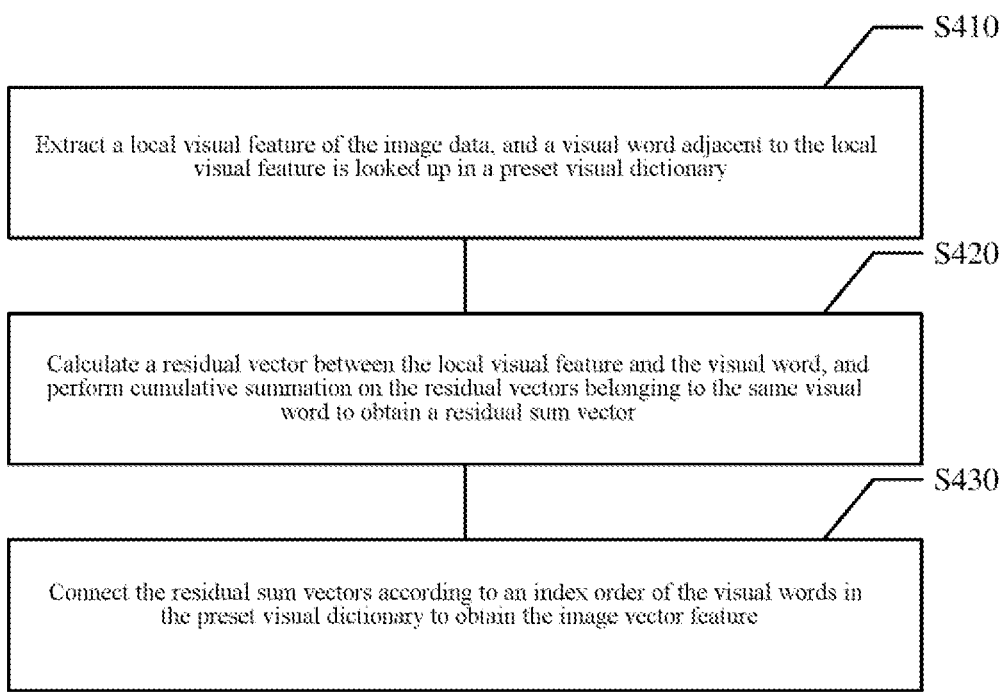
FIG. 4 schematically shows a flowchart of a method for feature encoding a local visual feature of image data to obtain an image vector feature according to an exemplary embodiment of the present disclosure.

In this exemplary embodiment, first, the local visual feature of the image data is feature coded to obtain the image vector feature. Specifically, referring to FIG. 4, the feature encoding of the local visual feature of the image data to obtain the image vector feature may include step S410 to step S430.

In step S410, a local visual feature of the image data is extracted, and a visual word adjacent to the local visual feature is searched for in a preset visual dictionary.

In step S420, a residual vector between the local visual feature and the visual word is calculated, and cumulative summation is performed on the residual vectors belonging to the same visual word to obtain a residual sum vector.

In step S430, the residual sum vectors are connected according to an index order of the visual words in the preset visual dictionary to obtain the image vector feature.

Hereinafter, step S410 to step S430 will be explained and described. First, a visual dictionary is acquired, and the dictionary may be trained using a general image database and K-means algorithm, or may use a third-party public visual dictionary, which contains k visual words. Secondly, a local visual feature of the image data may be extracted based on Scale invariant feature transform (SIFT), Accelerated Up Robust Features (SURF), Oriented FAST and Rotated BRIEF (ORB) and other algorithms. Specifically, the SIFT algorithm is taken as an example to explain and describe how to extract the local feature of the image data. Firstly, a scale space of the image data is generated, and extreme points of the scale space are detected. Then, the extreme points are located precisely, and a direction parameter is assigned for each key point. Finally, a key point descriptor is generated based on the direction parameter to obtain the local visual feature. Further, a residual vector of the local visual feature and the nearest neighbor visual word is calculated, and the residual vectors belonging to the same visual word are accumulated and summed; after the above calculation of all visual features is completed, all residual sum vectors are connected end to end according to the index order of visual words to form one super long vector as the expression of one image.

Figure 5:
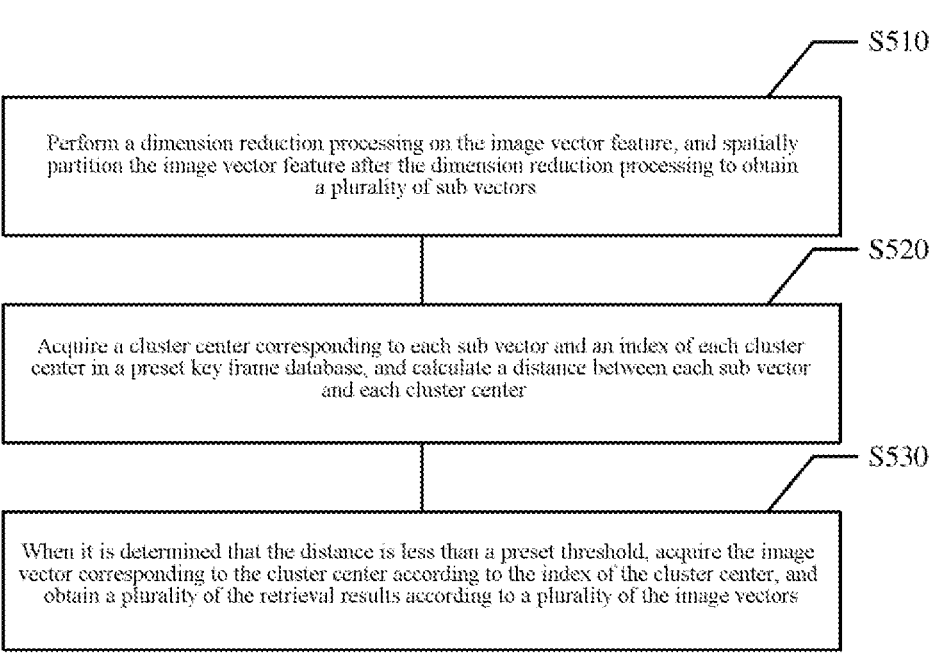
FIG. 5 schematically shows a flowchart of a method for retrieving the image vector feature after dimension reduction processing in a preset key frame database to obtain a plurality of retrieval results according to an exemplary embodiment of the present disclosure.

Further, in this exemplary embodiment, after the image vector feature is obtained, it is also necessary to retrieve the image vector feature after dimension reduction processing in a preset key frame database to obtain a plurality of retrieval results. Specifically, referring to FIG. 5, retrieving the image vector feature after dimension reduction processing in the preset key frame database to obtain a plurality of retrieval results may include steps S510 to S530.

In step S510, a dimension reduction processing is performed on the image vector feature, and the image vector feature after the dimension reduction processing is spatially partitioned to obtain a plurality of sub vectors.

In step S520, a cluster center corresponding to each sub vector and an index of each cluster center are acquired in the preset key frame database, and a distance between each sub vector and each cluster center is calculated.

In step S530, when it is determined that the distance is less than a preset threshold, the image vector corresponding to the cluster center is acquired according to the index of the cluster center, and a plurality of the retrieval results are obtained according to a plurality of the image vectors.

Hereinafter, steps S510 to S530 will be explained and described. Firstly, Principal Component Analysis (PCA) model is used to perform dimension reduction operation of the image vector feature. Specifically, it may include: performing mean normalization on the image vector feature, and then calculating a covariance matrix according to the normalized image vector feature; performing singular value decomposition on the covariance matrix, selecting eigenvectors corresponding to the first K eigenvalues, and outputting a projection feature matrix whose dimension is reduced, and finally outputting the image vector feature after dimension reduction. Then, based on PQ algorithm, the image vector feature after dimension reduction processing is retrieved to obtain a plurality of retrieval results.

The principle of Product Quantization (PQ) model is as follows.

First, an image vector expression database compressed by PCA is acquired, which includes D dimension expression of N images, namely N*D dimension matrix.

Secondly, the above matrix is divided into M sub matrices, called subspaces, and the dimension of each subspace is D/M. For example, when D=128, and M=8, d=D/M=128/8=16.

Then, cluster analysis is performed on N vectors in each subspace using k-means algorithm to obtain k cluster centers.

Finally, a nearest neighbor cluster center is searched for N vectors of each subspace using the KNN algorithm, and N vectors of all M subspaces and the indexes of the corresponding nearest neighbor cluster centers are made into a lookup table of the database.

Further, retrieving the image vector feature after the dimension reduction processing based on the PQ algorithm to obtain a plurality of retrieval results may include: first, space division is performed on the image vector feature after the dimension reduction processing to obtain a plurality of sub vectors, and an index and distance of each sub vector corresponding to all cluster centers are calculated, and an online lookup table is made; then, when calculating a similarity between the current image vector and any image vector in the database, the index number of the image vector in the database in the M subspaces is searched in the lookup table of the database; finally, a corresponding distance is searched in the online lookup table according to the index number, the distances of M subspaces are accumulated, and the accumulative sum of the distances is used as the similarity between the current image vector and the image vector in the database.

In step S130, the pose of the robot is solved according to the retrieval results to obtain a first pose initial value, and the laser point cloud data is matched in a preset two-dimensional grid map according to the speed data and displacement data to obtain a first matching result.

In this exemplary embodiment, first, feature matching is performed on each retrieval result to obtain the matching features between individual retrieval results and the matching relationship between the matching features; secondly, according to the matching features and the matching relationship between the matching features, the pose of the robot is solved to obtain the first pose initial value; then, the speed data and displacement data are fused to obtain a second pose initial value; further, based on the second pose initial value, the laser point cloud data is matched in the preset two-dimensional grid map to obtain the first matching result. The details are as follows.

First, feature level matching is performing on the acquired N images (retrieval results) to obtain the matching features between individual retrievals and the matching relationship between the matching features, and the retrieval result(s) meeting a certain matching threshold is retained; secondly, the pose of the matching features and matching relationships is solved using the Perspective-n-Point (PnP, three-dimensional to two-dimensional point to point motion) algorithm, and the pose is optimized using the least squares to obtain the first pose initial value; further, IMU and Odom data are fused based on Extended Kalman Filter (EKF) to obtain the second pose initial value (translation and rotation); finally, based on the Canonical Scan Matcher (CSM) algorithm and the second pose initial value, the laser point cloud data is matched in the preset 2D grid map to obtain the first matching result.

In step S140, when it is determined that the first pose initial value and the first matching result are inconsistent, a second matching result is generated according to the first pose initial value and the first matching result, and the robot is relocated according to the second pose initial value, the first matching result, and the second matching result.

In this exemplary embodiment, first, it is determined whether the first pose initial value and the first matching result are consistent. If they are consistent, it is proved that the position of the robot is accurate, and there is no need to relocate; if not, a new visual matching result (second matching result) is generated according to the first pose initial value and the first matching result, and then the robot is relocated according to the second pose initial value, the first matching result and the second matching result.

Figure 6:
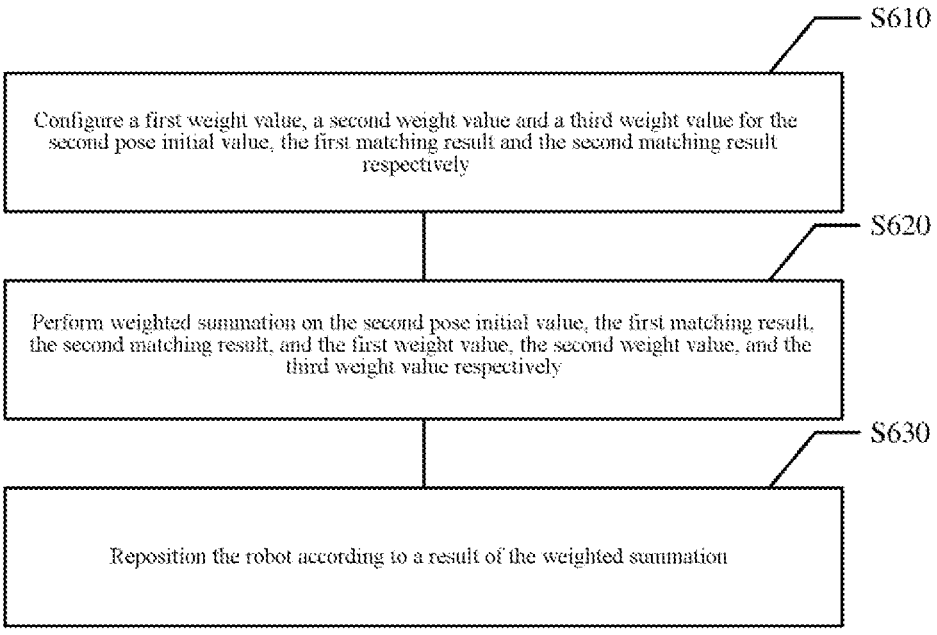
FIG. 6 schematically shows a flowchart of a method for repositioning the robot according to a second pose initial value, a first matching result and a second matching result according to the exemplary embodiment of the present disclosure.

Specifically, referring to FIG. 6, repositioning the robot according to the second pose initial value, the first matching result and the second matching result may include step S610 to step S630.

In step S610, a first weight value, a second weight value and a third weight value are configured for the second pose initial value, the first matching result and the second matching result respectively.

In step S620, weighted summation is performed on the second pose initial value, the first matching result, the second matching result, and the first weight value, the second weight value, and the third weight value respectively.

In step S630, the robot is repositioned according to a result of the weighted summation.

Hereinafter, step S610 to step S630 will be explained and described. In particular:

$$\varepsilon = \mathrm{argmin}\{\alpha R_{ekf} + \beta R_{csm} + \gamma R_{vision}\}$$

where $\varepsilon$ is the repositioning result of the robot, $R_{ekf}$ is the second pose initial value, $R_{csm}$ is the first matching result, $R_{vision}$ is the second matching result, and $\alpha$, $\beta$, $\gamma$ are respectively the first weight value, the second weight value, and the third weight value, and $\alpha + \beta + \gamma = 1$.

In the following, the repositioning method of the robot in the exemplary embodiment of the present disclosure will be further explained and described in combination with FIG. 7. Referring to FIG. 7, the robot's repositioning method may include the following steps.

In step S710, one frame of image is acquired and a local visual feature is extracted from the image.

In step S720, image encoding is performed on the frame image, and dimension reduction operation is performed using a PCA model.

In step S730, image retrieval is performed in the database using the PQ model to acquire the most similar N images.

In step S740, feature level matching is performed on the acquired N images, images meeting a certain threshold are retained, and a matching relationship of the feature is saved.

In step S750, the pose of the matching feature is solved using the PnP algorithm, and the pose is optimized using the least squares to obtain the first pose initial value.

In step S760, IMU and Odom data are fused based on Extended Kalman Filter (EKF) to obtain the second pose initial value; and based on the CSM algorithm and the second pose initial value, the laser point cloud data is matched in the preset 2D grid map to obtain the first matching result.

In step S770, when it is determined that the first pose initial value is inconsistent with the first matching result, a second matching result is generated according to the first pose initial value and the first matching result.

In step S780, the robot is repositioned according to the second pose initial value, the first matching result and the second matching result.

The robot positioning method provided by the exemplary embodiments of the present disclosure can solve the problems such as positioning errors and long positioning time caused by using laser point cloud matching in large scenes; at the same time, using the second position initial value to provide one positioning initial value for laser point cloud matching can greatly improve the speed and accuracy of relocation.

Figure 8:
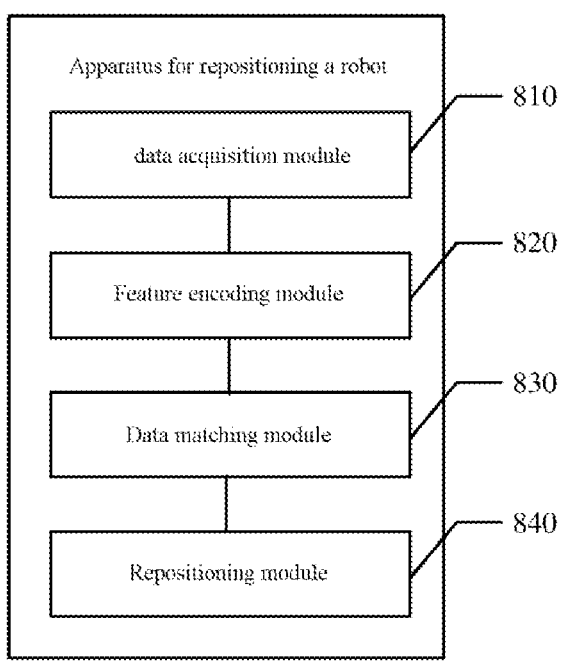
FIG. 8 schematically shows a block diagram of an apparatus for repositioning a robot according to an exemplary embodiment of the present disclosure.

The exemplary embodiment of the present disclosure also provides an apparatus for repositioning a robot. Referring to FIG. 8, the apparatus for repositioning a robot may include a data acquisition module 810, a feature encoding module 820, a data matching module 830, and a repositioning module 840.

The data acquisition module 810 may be configured to acquire image data of a robot collected by a camera apparatus, speed data and displacement data of the robot collected by an inertial measurement apparatus and a displacement measurement apparatus, and laser point cloud data of the robot collected by a laser radar.

The feature encoding module 820 may be configured to perform a feature encoding on a local visual feature of the image data to obtain an image vector feature, and retrieve the image vector feature after a dimension reduction processing in a preset key frame database to obtain a plurality of retrieval results.

The data matching module 830 may be configured to solve a pose of the robot according to the retrieval results to obtain a first pose initial value, and match the laser point cloud data in a preset two-dimensional grid map according to the speed data and displacement data to obtain a first matching result;

The repositioning module 840 may be configured to, when determining that the first pose initial value and the first matching result are inconsistent, generate a second matching result according to the first pose initial value and the first matching result, and reposition the robot according to a second pose initial value, the first matching result and the second matching result.

In an exemplary embodiment of the present disclosure, performing the feature encoding on the local visual feature of the image data to obtain the image vector feature includes:

extracting the local visual feature of the image data, and searching for a visual word adjacent to the local visual feature in a preset visual dictionary;

calculating a residual vector between the local visual feature and the visual word, and performing a accumulative sum operation on the residual vectors belonging to a same visual word to obtain a residual sum vector;

connecting the residual sum vectors according to an index order of the visual words in the preset visual dictionary to obtain the image vector feature.

In an exemplary embodiment of the present disclosure, retrieving the image vector feature after dimension reduction processing in the preset key frame database to obtain a plurality of retrieval results includes:

performing the dimension reduction processing on the image vector feature, and spatially dividing the image vector feature after the dimension reduction processing to obtain a plurality of sub vectors;

acquiring a cluster center corresponding to each sub vector and an index of each cluster center in the preset key frame database, and calculating a distance between each sub vector and each cluster center;

when determining that the distance is less than a preset threshold, acquiring the image vector corresponding to the cluster center according to the index of the cluster center, and obtain a plurality of retrieval results according to a plurality of the image vectors.

In an exemplary embodiment of the present disclosure, solving the pose of the robot according to the retrieval results to obtain the first pose initial value includes:

Performing a feature matching on each retrieval result to obtain matching features between the retrieval results and a matching relationship between the matching features;

solving the pose of the robot according to the matching features and the matching relationship between the matching features, to obtain the first pose initial value.

In an exemplary embodiment of the present disclosure, matching the laser point cloud data in a preset two-dimensional grid map according to the speed data and displacement data to obtain the first matching result includes:

fusing the speed data and the displacement data to obtain a second pose initial value;

matching the laser point cloud data in the preset two-dimensional grid map based on the second pose initial value to obtain the first matching result.

In an exemplary embodiment of the present disclosure, repositioning the robot according to the second pose initial value, the first matching result and the second matching result includes:

configuring a first weight value, a second weight value and a third weight value respectively for the second pose initial value, the first matching result and the second matching result;

performing weighted summation on the second pose initial value, the first matching result, the second matching result, and the first weight value, the second weight value, and the third weight value respectively;

repositioning the robot according to a result of the weighted summation.

In an exemplary embodiment of the present disclosure, the apparatus for repositioning a robot further includes:

a determination module, which may be configured to determine whether the image data meets a preset conditions; if yes, store the image data in the key frame database as a key frame;

where the preset conditions include at least one of the following:

a difference between the speed data and speed data at a previous moment corresponding to the speed data is greater than a preset speed threshold;

a difference between the displacement data and displacement data at a previous moment corresponding to the displacement data is greater than a preset displacement threshold;

an overlapping part between the image data and image data of a previous frame corresponding to the image data is less than a preset overlapping threshold.

The specific details of each module in the apparatus for repositioning a robot have been described in detail in the corresponding method for repositioning a robot, which will not repeated here.

It should be noted that although several modules or units of the device for action execution are mentioned in the above detailed description, this division is not mandatory. In fact, according to the implementations of the present disclosure, the features and functions of two or more modules or units described above can be embodied in one module or unit. On the contrary, the features and functions of one module or unit described above can be further divided into a plurality of modules or units for materialization.

In addition, although the steps of the method in the present disclosure are described in the drawings in a specific order, this does not require or imply that these steps must be performed in the specific order, or that all the steps shown must be performed to achieve the desired results. Additionally or optionally, some steps can be omitted, some steps can be merged into one step for execution, and/or one step can be decomposed into multiple steps for execution.

In the exemplary embodiment of the present disclosure, an electronic device capable of realizing the above method is also provided.

Those skilled in the art can understand that various aspects of the present disclosure can be implemented as systems, methods or program products. Therefore, all aspects of the present disclosure can be specifically implemented in the following forms, namely, a complete hardware implementation, a complete software implementation (including firmware, microcode, etc.), or a combination of hardware and software, which can be collectively referred to as "circuit", "module" or "system".

The electronic device 900 according to this implementation of the present disclosure is described below with reference to FIG. 9. The electronic device 900 shown in FIG. 9 is only an example, and should not impose any restrictions on the functions and scope of use of the embodiments of the present disclosure.

Figure 9:
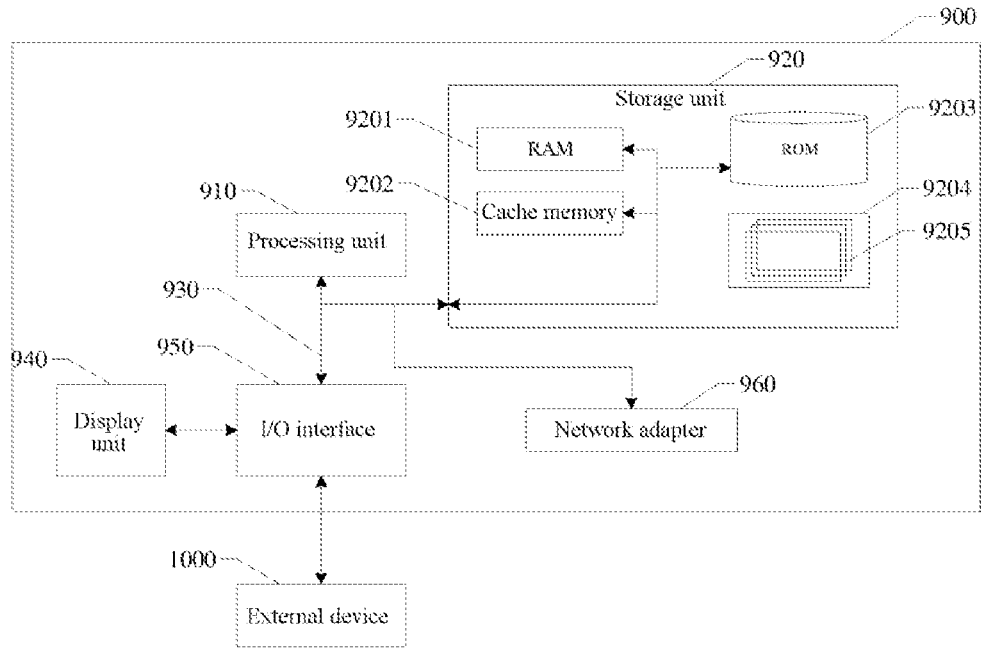
FIG. 9 schematically shows an electronic device for realizing the above described method for repositioning a robot according to an exemplary embodiment of the present disclosure.

As shown in FIG. 9, the electronic device 900 is represented in the form of a general-purpose computing device. The components of the electronic device 900 may include, but are not limited to, at least one processing unit 910, at least one storage unit 920, a bus 930 connecting different system components (including the storage unit 920 and the processing unit 910), and a display unit 940.

The storage unit stores a program code, which can be executed by the processing unit 910, so that the processing unit 910 executes the steps according to various exemplary embodiments of the present disclosure described in the "exemplary method" section of the description. For example, the processing unit 910 may perform step S110 as shown in FIG. 1: acquiring image data of the robot acquired by an imaging device, speed data and displacement data of the robot acquired by an inertial measuring apparatus and a displacement measuring apparatus, and laser point cloud data of the robot acquired by a laser radar; step S120: performing feature encoding on a local visual feature of the image data to obtain an image vector feature, and retrieving the image vector feature after dimension reduction processing in a preset key frame database to obtain a plurality of retrieval results; step S130: solving a pose of the robot according to the retrieval results to obtain a first pose initial value, and matching the laser point cloud data in a preset two-dimensional grid map according to the speed data and displacement data to obtain a first matching result; step S140: when it is determined that the first pose initial value and the first matching result are inconsistent, generating a second matching result according to the first pose initial value and the first matching result, and repositioning the robot according to the second pose initial value, the first matching result and the second matching result.

The storage unit 920 may include a readable medium in the form of a volatile storage unit, such as a random access storage unit (RAM) 9201 and/or a cache storage unit 9202, and may further include a read-only storage unit (ROM) 9203.

The storage unit 920 may also include a program/utility 9204 having a set of (at least one) program modules 9205, such program modules 9205 include, but are not limited to, an operating system, one or more applications, other program modules, and program data. Each or some combination of these examples may include the implementation of a network environment.

The bus 930 may represent one or more types of bus structures, including a storage unit bus or a storage unit controller, a peripheral bus, a graphics acceleration port, a processing unit, or a local area bus using any bus structure in a variety of bus structures.

The electronic device 900 may also communicate with one or more external devices 1000 (such as keyboards, pointing devices, Bluetooth devices, etc.), one or more devices that enable users to interact with the electronic device 900, and/or any device (such as routers, modems, etc.) that enables the electronic device 900 to communicate with one or more other computing devices. This communication may be performed via the input/output (110) interface

950. Furthermore, the electronic device 900 may also communicate with one or more networks (such as a local area network (LAN), a wide area network (WAN), and/or a public network, such as the Internet) through a network adapter 960. As shown in the drawings, the network adapter 960 communicates with other modules of the electronic device 900 through the bus 930. It should be understood that although not shown in the drawings, other hardware and/or software modules can be used in combination with the electronic device 900, including but not limited to: microcode, device drivers, redundant processing units, external disk drive arrays, RAID systems, tape drives, data backup storage systems, etc.

Through the above description of the implementations, it is easy for those skilled in the art to understand that the example implementations described here can be realized by software, or by combining software with necessary hardware. Therefore, the technical solution according to the implementations of the present disclosure can be embodied in the form of a software product, which can be stored in a non-volatile storage medium (which may be a CD-ROM, a USB flash disk, a mobile hard disk, etc.) or on a network, and includes several instructions to enable a computing device (which may be a personal computer, a server, a terminal apparatus, or a network device, etc.) to execute the method according to the implementations of the present disclosure.

In the exemplary embodiments of the present disclosure, a computer-readable storage medium is also provided, on which a program product capable of realizing the methods described in the present specification is stored. In some possible implementations, various aspects of the present disclosure can also be implemented in the form of a program product, which includes program code. When the program product runs on a terminal device, the program code is used to enable the terminal device to perform the steps according to various exemplary implementations of the present disclosure described in the above "exemplary methods" section of the description.

The program product for realizing the above method according to the implementations of the present disclosure may use a portable compact disc read-only memory (CD-ROM) and include program code, and may run on a terminal device, such as a personal computer. However, the program product of the present disclosure is not limited thereto. In the present disclosure, the readable storage medium may be any tangible medium containing or storing a program, and the program may be used by or in combination with an instruction execution system, apparatus, or device.

The program product may adopt any combination of one or more readable media. The readable medium may be a readable signal medium or a readable storage medium. The readable storage medium may be, for example, but not limited to, an electrical, magnetic, optical, electromagnetic, infrared, or semiconductor system, apparatus, or device, or any combination thereof. More specific examples (not exhaustive) of the readable storage media include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable signal medium may include a data signal that is propagated in baseband or as part of a carrier wave, in which the readable program code is carried. Such propagated data signal may take various forms, including but not limited to electromagnetic signals, optical signals or any suitable combination of the above. The readable signal medium may also be any readable medium other than a readable storage medium, which may send, propagate, or transmit programs for use by or in combination with an instruction execution system, apparatus, or device.

The program code contained in the readable medium can be transmitted by any suitable medium, including but not limited to wireless, wired, optical cable, RF, etc., or any suitable combination of the above.

The program code for performing the operations of the present disclosure may be written in any combination of one or more programming languages, the programming languages including object-oriented programming languages— such as Java, C++, etc., and also conventional procedural programming languages—such as "C" language or similar programming languages. The program code may be executed entirely on the user computing device, executed partially on the user device, executed as a stand-alone package, executed partially on the user computing device and partially on the remote computing device, or executed entirely on the remote computing device or the server. In the case involving the remote computing device, the remote computing device may be connected to the user computing device via any kind of network, including a local area network (LAN) or a wide area network (WAN), or, alternatively, may be connected to an external computing device (e.g. using an Internet service provider to connect via the Internet).

In addition, it should be noted that the above-mentioned drawings are only schematic illustrations of the processes included in the methods according to the exemplary embodiments of the present disclosure, and are not intended to limiting the present disclosure. It is easy to understand that the processes shown in the above drawings do not indicate or limit the chronological order of these processes. In addition, it is also readily understood that these processes may be performed synchronously or asynchronously, for example, in a plurality of modules.

Other embodiments of the present disclosure will readily come to the mind of those skilled in the art upon consideration of the specification and practice of the present disclosure. The present application is intended to cover any variations, uses or adaptations of the present disclosure that follow the general principles of the present disclosure and include common knowledge or customary technical means in the art that are not disclosed herein. The specification and embodiments are considered exemplary only and the true scope and spirit of the present disclosure is indicated by the claims.

What is claimed is:

1. A method for repositioning a robot, comprising:
acquiring image data of the robot collected by a camera apparatus, speed data and displacement data of the robot collected by an inertial measuring apparatus and a displacement measuring apparatus, and laser point cloud data of the robot collected by a laser radar;
performing a feature encoding on a local visual feature of the image data to obtain an image vector feature, and retrieving the image vector feature after a dimension reduction processing in a preset key frame database to obtain a plurality of retrieval results;
solving a post of the robot according to the retrieval results to obtain a first post initial value, and matching the laser point cloud data in a preset two-dimensional grid map according to the speed data and displacement data to obtain a first matching result; and
in response to determination that the first post initial value and the first matching result are inconsistent, generating a second matching result according to the first post initial value and the first matching result, and repositioning the robot according to a second pose initial value, the first matching result, and the second matching result.

2. The method for repositioning a robot according to claim 1, wherein the performing the feature encoding on the local visual feature of the image data to obtain the image vector feature comprises:
extracting the local visual feature of the image data, and searching for a visual word adjacent to the local visual feature in a preset visual dictionary;
calculating a residual vector between the local visual feature and the visual word, and performing a cumulative sum operation on the residual vectors belonging to a same visual word to obtain a residual sum vector; and
connecting the residual sum vectors according to an index order of the visual words in the preset visual dictionary to obtain the image vector feature.

3. The method for repositioning a robot according to claim 1, wherein the retrieving the image vector feature after the dimension reduction processing in the preset key frame database to obtain the plurality of retrieval results, comprises:
performing the dimension reduction processing on the image vector feature, and spatially dividing the image vector feature after the dimension reduction processing to obtain a plurality of sub vectors;
acquiring a cluster center corresponding to each sub vector and an index of each cluster center in the preset key frame database, and calculating a distance between each sub vector and each cluster center;
in response to determination that the distance is less than a preset threshold, acquiring an image vector corresponding to the cluster center according to the index of the cluster center, and obtaining a plurality of the retrieval results according to a plurality of the image vectors.

4. The method for repositioning a robot according to claim 1, wherein the solving the post of the robot according to the retrieval results to obtain the first post initial value, comprises:
performing a feature matching on each retrieval result to obtain matching features between individual retrieval results and a matching relationship between the matching features;
solving the pose of the robot according to the matching features and the matching relationship between the matching features, to obtain the first pose initial value.

5. The method for repositioning a robot according to claim 1, wherein the matching the laser point cloud data in the preset two-dimensional grid map according to the speed data and displacement data to obtain the first matching result, comprises:
fusing the speed data and the displacement data to obtain a second pose initial value;
matching the laser point cloud data in the preset two-dimensional grid map based on the second pose initial value to obtain the first matching result.

6. The method for repositioning a robot according to claim 1, wherein the repositioning the robot according to the second pose initial value, the first matching result and the second matching result, comprises:

configuring a first weight value, a second weight value and a third weight value respectively for the second pose initial value, the first matching result and the second matching result;

performing a weighted summation on the second pose initial value, the first matching result, the second matching result, and the first weight value, the second weight value, and the third weight value respectively;

repositioning the robot according to a result of the weighted summation.

7. The method for repositioning a robot according to claim 1, wherein the method for repositioning a robot further comprises:

determining whether the image data meets a preset condition; if yes, storing the image data in the key frame database as a key frame;

wherein the preset condition comprises at least one of the following:

a difference between the speed data and speed data at a previous moment corresponding to the speed data is greater than a preset speed threshold;

a difference between the displacement data and displacement data at a previous moment corresponding to the displacement data is greater than a preset displacement threshold;

an overlapping part between the image data and image data of a previous frame corresponding to the image data is less than a preset overlapping threshold.

8. An apparatus for repositioning a robot, comprises:

a processor; and a memory for storing executable instructions of the processor;

wherein the processor is configured to:

acquire image data of the robot collected by a camera apparatus, speed data and displacement data of the robot collected by an inertial measuring apparatus and a displacement measuring apparatus, and laser point cloud data of the robot collected by a laser radar;

perform a feature encoding on a local visual feature of the image data to obtain an image vector feature, and retrieve the image vector feature after a dimension reduction processing in a preset key frame database to obtain a plurality of retrieval results;

solve a pose of the robot according to the retrieval results to obtain a first pose initial value, and match the laser point cloud data in a preset two-dimensional grid map according to the speed data and displacement data to obtain a first matching result; and in response to determination that the first post initial value and the first matching result are inconsistent, generate a second matching result according to the first pose initial value and the first matching result, and reposition the robot according to a second pose initial value, the first matching result and the second matching result.

9. A non-transitory computer-readable storage medium on which a computer program is stored, wherein when the computer program is executed by a processor, the processor is configured to:

acquire image data of the robot collected by a camera apparatus, speed data and displacement data of the robot collected by an inertial measuring apparatus and a displacement measuring apparatus, and laser point cloud data of the robot collected by a laser radar;

perform a feature encoding on a local visual feature of the image data to obtain an image vector feature, and retrieve the image vector feature after a dimension reduction processing in a preset key frame database to obtain a plurality of retrieval results;

solve a pose of the robot according to the retrieval results to obtain a first pose initial value, and match the laser point cloud data in a preset two-dimensional grid map according to the speed data and displacement data to obtain a first matching result; and in response to determination that the first post initial value and the first matching result are inconsistent, generate a second matching result according to the first pose initial value and the first matching result, and reposition the robot according to a second pose initial value, the first matching result and the second matching result.

10. The apparatus for repositioning a robot according to claim 8, wherein the processor is further configured to:

extract the local visual feature of the image data, and searching for a visual word adjacent to the local visual feature in a preset visual dictionary;

calculate a residual vector between the local visual feature and the visual word, and performing a cumulative sum operation on the residual vectors belonging to a same visual word to obtain a residual sum vector; and connect the residual sum vectors according to an index order of the visual words in the preset visual dictionary to obtain the image vector feature.

11. The apparatus for repositioning a robot according to claim 8, wherein the processor is further configured to:

perform the dimension reduction processing on the image vector feature, and spatially dividing the image vector feature after the dimension reduction processing to obtain a plurality of sub vectors;

acquire a cluster center corresponding to each sub vector and an index of each cluster center in the preset key frame database, and calculating a distance between each sub vector and each cluster center;

in response to determination that the distance is less than a preset threshold, acquire an image vector corresponding to the cluster center according to the index of the cluster center, and obtain a plurality of the retrieval results according to a plurality of the image vectors.

12. The apparatus for repositioning a robot according to claim 8, wherein the processor is further configured to:

perform a feature matching on each retrieval result to obtain matching features between individual retrieval results and a matching relationship between the matching features;

solve the pose of the robot according to the matching features and the matching relationship between the matching features, to obtain the first pose initial value.

13. The apparatus for repositioning a robot according to claim 8, wherein the processor is further configured to:

fuse the speed data and the displacement data to obtain a second pose initial value;

match the laser point cloud data in the preset two-dimensional grid map based on the second pose initial value to obtain the first matching result.

14. The apparatus for repositioning a robot according to claim 8, wherein the processor is further configured to:

configure a first weight value, a second weight value and a third weight value respectively for the second pose initial value, the first matching result and the second matching result;

perform a weighted summation on the second pose initial value, the first matching result, the second matching result, and the first weight value, the second weight value, and the third weight value respectively;

reposition the robot according to a result of the weighted summation.

15. The apparatus for repositioning a robot according to claim 8, wherein the processor is further configured to:

determine whether the image data meets a preset condition; if yes, storing the image data in the key frame database as a key frame;

wherein the preset condition comprises at least one of the following:

a difference between the speed data and speed data at a previous moment corresponding to the speed data is greater than a preset speed threshold;

a difference between the displacement data and displacement data at a previous moment corresponding to the displacement data is greater than a preset displacement threshold;

an overlapping part between the image data and image data of a previous frame corresponding to the image data is less than a preset overlapping threshold.

16. The non-transitory computer-readable storage medium according to claim 9, wherein the processor is further configured to:

extract the local visual feature of the image data, and searching for a visual word adjacent to the local visual feature in a preset visual dictionary;

calculate a residual vector between the local visual feature and the visual word, and performing a cumulative sum operation on the residual vectors belonging to a same visual word to obtain a residual sum vector; and connect the residual sum vectors according to an index order of the visual words in the preset visual dictionary to obtain the image vector feature.

17. The non-transitory computer-readable storage medium according to claim 9, wherein the processor is further configured to:

perform the dimension reduction processing on the image vector feature, and spatially dividing the image vector feature after the dimension reduction processing to obtain a plurality of sub vectors;

acquire a cluster center corresponding to each sub vector and an index of each cluster center in the preset key frame database, and calculating a distance between each sub vector and each cluster center;

in response to determination that the distance is less than a preset threshold, acquire an image vector corresponding to the cluster center according to the index of the cluster center, and obtain a plurality of the retrieval results according to a plurality of the image vectors.

18. The non-transitory computer-readable storage medium according to claim 9, wherein the processor is further configured to:

perform a feature matching on each retrieval result to obtain matching features between individual retrieval results and a matching relationship between the matching features;

solve the pose of the robot according to the matching features and the matching relationship between the matching features, to obtain the first pose initial value.

19. The non-transitory computer-readable storage medium according to claim 9, wherein the processor is further configured to:

fuse the speed data and the displacement data to obtain a second pose initial value;

match the laser point cloud data in the preset two-dimensional grid map based on the second pose initial value to obtain the first matching result.

20. The non-transitory computer-readable storage medium according to claim 9, wherein the processor is further configured to:

configure a first weight value, a second weight value and a third weight value respectively for the second pose initial value, the first matching result and the second matching result;

perform a weighted summation on the second pose initial value, the first matching result, the second matching result, and the first weight value, the second weight value, and the third weight value respectively;

reposition the robot according to a result of the weighted summation.

\* \* \* \* \*